(12) United States Patent
Bockelkamp et al.

(10) Patent No.: US 9,797,947 B2
(45) Date of Patent: Oct. 24, 2017

(54) ARRANGEMENT FOR SELECTIVE ENABLING OF A DEBUGGING INTERFACE

(71) Applicant: dSPACE digital signal processing and control engineering GmbH, Paderborn (DE)

(72) Inventors: Matthias Bockelkamp, Paderborn (DE); Marc Dressler, Horn-Bad Meinberg (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 14/804,692

(22) Filed: Jul. 21, 2015

(65) Prior Publication Data

US 2016/0018465 A1    Jan. 21, 2016

(30) Foreign Application Priority Data

Jul. 21, 2014   (DE) ........................ 10 2014 110 197

(51) Int. Cl.
```
G06F 11/36        (2006.01)
G01R 31/3177      (2006.01)
G06F 21/57        (2013.01)
```
(52) U.S. Cl.
CPC ...... *G01R 31/3177* (2013.01); *G06F 11/3648* (2013.01); *G06F 11/3652* (2013.01); *G06F 11/3656* (2013.01); *G06F 21/575* (2013.01)

(58) Field of Classification Search
CPC ............. G06F 11/3648; G06F 11/3652; G06F 11/3656

See application file for complete search history.

(56) References Cited

U.S. PATENT DOCUMENTS

| 6,769,065 B2 | 7/2004 | Mayer |
| 6,910,127 B1 | 6/2005 | Player |

(Continued)

FOREIGN PATENT DOCUMENTS

| DE | 10 2009 056 758 A1 | 7/2010 |
| EP | 2 608 102 A1 | 6/2013 |
| JP | H 03-205690 A | 9/1991 |

OTHER PUBLICATIONS

Extended European Search Report for European Application No. 15177297.7 dated Nov. 26, 2015 with English translation.

(Continued)

*Primary Examiner* — Joseph Schell
(74) *Attorney, Agent, or Firm* — Muncy, Geissler, Olds & Lowe, P.C.

(57) ABSTRACT

An arrangement for disabling a configuration of a first programmable hardware component, having the first programmable hardware component, a second programmable hardware component, and a switching element. The first programmable hardware component has a configuration interface for configuring a logic of the first programmable hardware component, a data interface for communication of the logic with the second programmable hardware component, a debugging interface for debugging and configuring the logic, and a configuration monitoring interface for signaling a configuration process of the logic. The switching element is designed and connected to the debugging interface such that access to the debugging interface during a configuration process of the logic can be disabled.

16 Claims, 3 Drawing Sheets

(56) References Cited

U.S. PATENT DOCUMENTS

| | | |
|---|---|---|
| 7,149,636 B2 | 12/2006 | Cyran et al. |
| 7,665,002 B1 * | 2/2010 | White ............... G01R 31/31705 714/727 |
| 7,971,051 B2 | 6/2011 | Paul et al. |
| 8,686,753 B1 | 4/2014 | Herrmann et al. |
| 2004/0113655 A1 | 6/2004 | Curd et al. |
| 2006/0119384 A1 * | 6/2006 | Camarota ............ G06F 15/7867 326/38 |
| 2009/0013224 A1 * | 1/2009 | Ziaja ................... G06F 11/2236 714/724 |
| 2010/0165734 A1 * | 7/2010 | Moh ....................... G06F 13/16 365/185.18 |
| 2010/0192015 A1 | 7/2010 | Dressler et al. |
| 2010/0199077 A1 * | 8/2010 | Case ................... G06F 11/3656 713/1 |
| 2011/0145934 A1 | 6/2011 | Abramovici et al. |
| 2013/0031420 A1 * | 1/2013 | Haverkamp ............ G06F 21/74 714/45 |
| 2013/0166975 A1 * | 6/2013 | Son .................. G01R 31/31719 714/727 |

OTHER PUBLICATIONS

Park et al., "JTAG Security System Based on Credentials," J. of Electronic Testing, Theory and Applications, vol. 26, No. 5, pp. 549-557 (Sep. 1, 2010).

Pierce et al., "Multi-Level Secure JTAG Architecture," IEEE 17$^{th}$ Int'l On-Line Testing Symposium (IOLTS), pp. 208-209 (Jul. 13, 2011).

German Search Report for German Application No. 102015110729.5 dated Jun. 15, 2016 with English translation.

Das et al., "Secure JTAG Implementation using Schnorr Protocol," J. of Electronic Testing, vol. 29, No. 2, pp. 193-209 (2013).

Chinese Office Action for Chinese Application No. 201510680947.6 dated Jun. 23, 2017 with English translation.

\* cited by examiner

ARRANGEMENT FOR SELECTIVE ENABLING OF A DEBUGGING INTERFACE

This non-provisional application claims priority to German Patent Application No. 10 2014 110 197.9, which was filed on Jul. 21, 2014, and which is herein incorporated by reference.

BACKGROUND OF THE INVENTION

Field of the Invention

The invention relates to an arrangement and a method for disabling configuration or programming of a programmable hardware component, in particular of a PLD or a processor.

Description of the Background Art

PLDs, programmable logic devices, are integrated circuits using digital technology in which a logic circuit can be programmed or configured. To this end, the PLD has a configuration interface by which means the logic circuit in the PLD can be configured, thus, in concrete terms, defining the structural rules represented by the logic circuit for the basic functionality of individual universal blocks in the PLD and their connection to one another. PLDs include, in particular, FPGAs (field programmable gate arrays) and CPLDs (complex programmable logic devices).

Processors are integrated circuits using digital technology in which a logic circuit is largely hard-wired and in which a logic function can be programmed or configured by installing software. To this end, the processor has a configuration interface for installing software and for the manipulation of installed software.

In the following, a programmable hardware component can be understood to be, for example, a processor, a PLD, or a combination of the two. A logic can be understood to be, for example, a piece of software in a processor or a logic circuit in a PLD.

Oftentimes, programmable hardware components have, in addition to the configuration interface for configuring the hardware component, an additional debugging interface, which can be used primarily for debugging the logic programmed in the programmable hardware component, but which likewise permits configuration of the logic.

Also, some models have no separate configuration interface because the manufacturer only makes provision for configuration of the logic through the debugging interface. In this case it is possible to provide a separate configuration interface and a separate debugging interface by means of a circuit implemented outside of the hardware component. For example, the debugging interface can be connected to a switch that is set up to connect the debugging interface to a choice of a first external interface or a second external interface, wherein the first external interface is intended for programming the programmable hardware component, and the second external interface is made available to a user for debugging the logic programmed in the programmable hardware component, and wherein the switch is set up to connect the debugging interface to the first external interface during a programming process of the hardware component, and to connect the debugging interface to the second external interface when no programming process of the hardware component is taking place. For the invention it is unimportant whether a configuration interface and a debugging interface are each provided natively as a separate interface, or whether this is accomplished using a switch located outside of the hardware component.

Now if a configuration of the programmable hardware components by a user is to be disabled, an access by the user to the configuration interface can first be blocked. If the user is to have the option of debugging the logic of the programmable hardware component, however, the debugging interface must be enabled. But in the designs known from the prior art, however, this also means that the user not only can debug the programmable hardware component, but can also configure or program it.

In certain cases, programming of the programmable hardware component via the debugging interface is not desirable, however, such as when a first programmable hardware component, in particular an FPGA, is coupled to a second programmable hardware component, in particular a processor. An arrangement of this nature is known in the prior art, for example from computer systems for real time simulation of complex physical and electronic systems, where it allows the processor to pass certain computing processes, in particular especially time-critical computing processes, to the FPGA.

In an arrangement of this nature, it is useful to have configuration of the FPGA performed exclusively by the processor. A manufacturer of this type of computer system generally also offers a tool for configuration or programming of the computer system as a whole, including the FPGA coupled to the processor. During the course of programming the computer system, the processor will configure the coupled FPGA through a configuration interface, which is to say will write it with a logic. In addition to a part that is freely configurable by the user, this logic can also contain a mandatory interface logic, not configurable by the user or only configurable by the user to a limited degree, that governs the data exchange with the coupled processor in ongoing operation. In this way, defined communication behavior between the processor and the FPGA can be predetermined by the manufacturer of the computer system, and safety mechanisms against erroneous programming can be predetermined. Without these safety mechanisms, erroneous programming can result in erroneous behavior of the computer system, and in the worst case can even result in destruction of the FPGA or other installed hardware. The programmability of the FPGA through the debugging interface provides a possibility for circumventing these safety mechanisms. A programming access through the debugging interface causes overwriting of the entire logic present on the FPGA or at least of a selected subsection of its logic circuit, and in this way can also cause overwriting of the—actually mandatory—interface logic. For this reason, in the prior art the debugging interface in computer systems such as the one described above generally is not accessible to the user. As a result, however, it is also not possible for the user to use the debugging interface for purposes other than programming of the FPGA, for example for monitoring variables for the purpose of debugging the FPGA logic.

SUMMARY OF THE INVENTION

It is therefore an object of the invention to provide an arrangement for disabling configuration of a programmable hardware component by means of which it is possible to avoid damage to the hardware component, or to hardware connected to the hardware component, resulting from improper or prohibited programming of the hardware component, yet nevertheless access to the hardware component via the debugging interface for purposes other than programming or configuration is possible when necessary.

Accordingly, the object is attained in an exemplary embodiment by an arrangement for disabling a configuration of a first programmable hardware component having the programmable hardware component and a switching element, wherein the programmable hardware component has a configuration interface designed for programming a logic of the programmable hardware component, a data interface designed for data exchange with the hardware environment of the programmable hardware component, and a debugging interface designed for debugging and configuring the logic, wherein the switching element is designed and connected to the debugging interface in such a manner that access to the debugging interface during a configuration process of the logic circuit can be disabled. According to another embodiment, the programmable hardware component can have a configuration monitoring interface designed for signaling the configuration process of the logic circuit.

In an embodiment, the arrangement has a second programmable hardware component, and the data interface is designed for communication of the first programmable hardware component with the second programmable hardware component. In an embodiment of the arrangement, the first programmable hardware component is an FPGA and the second programmable hardware component is an FPGA or a processor.

An exemplary embodiment provides for a switching element by means of which access to the debugging interface during a configuration process can be disabled, wherein the switching element can be designed such that the access to the debugging interface is disabled during a configuration process. This means that on the one hand it is possible to configure the logic of the programmable hardware component by means of the configuration interface, and it also is likewise possible to carry out debugging of the logic with the debugging interface, but the access to the debugging interface can be blocked during a configuration process.

To this end, the programmable hardware component can be designed such that a configuration process is signaled both during a configuration or programming through the configuration interface and during a programming or configuration through the debugging interface. Alternatively, the configuration process, thus the programming or configuration of the logic, can likewise be detected from a trigger signal transmitted to the debugging interface, thus for example through extraction of a configuration command from the trigger signal. To this end, a suitably designed monitoring unit can be provided, for example, that examines the trigger signal for configuration commands. In the following, the two variants, which is to say the presence of the configuration monitoring interface and the absence of the configuration monitoring interface, are described as equivalent.

The signaling of the configuration process can take place through the output of a logic state of 0 or 1, or through a rising or falling edge. For example, through the output of a logic 0 on the configuration monitoring interface when the programmable hardware component is being programmed through the configuration interface or the debugging interface, which is to say a configuration process is taking place, and through the output of a logic 1 once the configuration of the hardware component has been completed. For this case, the switching element can be designed such that a configuration process for the programmable hardware component is detected in the presence of a logic 0 as the signal on the configuration monitoring interface or on the trigger signal for the debugging interface, so that an access to the debugging interface can be disabled, preferably is disabled, by the switching element.

The programmable hardware component can be a first programmable hardware component, and the data interface can be designed to communicate with a second programmable hardware component. The first programmable hardware component can be an FPGA and the second programmable hardware component can be a processor. The FPGA can fundamentally be implemented as a field programmable gate array, thus as an integrated circuit using digital technology, into which the logic circuit can be programmed or configured. The FPGA or the logic circuit of the FPGA communicates with the processor through a data interface. The processor can likewise be implemented as any desired processor. The FPGA can be designed such that the configuration of the FPGA can take place through the configuration interface and also through the debugging interface, whereby a configuration device for configuring the FPGA can be connected to the FPGA via the configuration interface.

The invention makes it possible to prevent erroneous behavior of a programmable hardware component as well as unintentional destruction of the programmable hardware component and the hardware connected to the programmable hardware component, for example a processor, because of prohibited, erroneous programming of the programmable hardware component by the means that a configuration access to the logic circuit of the programmable hardware component is possible only by means of the configuration interface, but not through the debugging interface, or only under special circumstances. In parallel therewith, the debugging interface nevertheless continues to be usable for other applications, in particular for debugging of the logic of the programmable hardware component. In other words, the switching element creates a supervisory authority through which data transmission through the debugging interface can be controlled with regard to a configuration of the programmable hardware component, wherein access to the debugging interface can be disabled by the supervisory authority in the case of unauthorized programming of the programmable hardware component, or can be allowed based on previously defined parameters, for example in an application-specific manner.

In an embodiment, the switching element is designed and connected to the configuration monitoring interface such that access to the debugging interface can be disabled, preferably is disabled, in the event of signaling of a configuration process by the configuration monitoring interface. In this embodiment, the access to the debugging interface can be disabled or is disabled when a configuration process is signaled by the configuration monitoring interface. The signaling of the configuration process can take place, for example, through a rising edge or falling edge of a signal output on the configuration monitoring interface, or else through a change of a signal from logic 0 to logic 1, or vice versa. The configuration interface itself can be designed such that a change in configuration of the logic circuit of the FPGA is detected.

In another embodiment, the switching element can be designed such that, in the event of a configuration process or in the event of detection of a configuration process of the logic of the programmable hardware component, the arrangement is switched off, thus can be placed in a voltage-free and/or current-free state. The signaling of the configuration process can take place through a signal generated by the programmable hardware component that changes during or immediately after commencement of a configuration or programming of the programmable hardware component and thus signals a commencement, the progress, and/or the end of the configuration process.

In an embodiment, the signaling of the configuration process or the corresponding signal for indicating the commencement, the performance, and/or the end of a process for configuring the programmable hardware component can be provided by a part of the programmable hardware component that is not configurable. This means that, in an embodiment of this nature, the logic circuit of the programmable hardware component cannot be configured such that the signaling of a configuration process cannot be output, which is to say that signaling of the configuration process must of necessity be provided by the configuration monitoring interface. Alternatively, the signaling of the configuration process can also take place through the logic circuit or through external circuitry such as pull-up or pull-down resistors, for example.

In an embodiment, the arrangement can have a configuration switching element that is designed to trigger the switching element. By means of an embodiment of this nature, configuration of the logic circuit through the debugging interface can be allowed, such as through suitable triggering of the switching element through the configuration switching element, even when a configuration process is signaled by the configuration switching element. This means that it is not only possible for the logic circuit of the FPGA to be debugged by means of the arrangement through the debugging interface, for example through a previously defined user intervention, but also for the configuration of the logic circuit to be programmed by means of the debugging interface, and hence in addition to the configuration interface.

Furthermore, the configuration switching element can be connected to the configuration monitoring interface and is designed to disable access to the debugging interface by triggering the switching element when a configuration process is signaled. Thus, when a configuration process is detected by the configuration monitoring interface, it is not direct triggering of the switching element that takes place to disable the access to the debugging interface, but instead the triggering of the switching element takes place through the configuration monitoring interface.

The switching element can be connected to the debugging interface by means of the configuration switching element in such a manner that access to the debugging interface in the event of a configuration process is optionally possible or not possible. In an embodiment of this nature, an access to the debugging interface can nevertheless be made possible by the configuration switching element even in a configuration process within which an access to the debugging interface could have been disabled by means of the switching element.

The configuration switching element can be located between the debugging interface and the switching element so that a connection between the switching element and the debugging interface can be made possible or blocked by the configuration switching element. Moreover, a signal level, for instance logic 0 or logic 1, can also be made available on the debugging interface by the configuration switching element. The configuration switching element can have a logic via which access to the debugging interface can be controlled as a function of predefined parameters. The logic can stand in communication connection with the programmable hardware component and/or a second programmable hardware component and/or an external configuration device for the programmable hardware component.

According to an embodiment, the configuration switching element can be designed to extract a configuration process from a trigger signal transmitted to the debugging interface. In other words, the configuration switching element can be developed to analyze the trigger signal transmitted to the debugging interface for bit sequences via which configuration of the programmable hardware component can be undertaken. The configuration switching element thus monitors the debugging interface with regard to trigger signals sent to the debugging interface, and evaluates the trigger signals in regard to whether a configuration process of the programmable hardware component is brought about through a trigger signal.

When an attempt at reprogramming the programmable hardware component is detected, the configuration process can be detected, for example still prior to the deletion or reprogramming of the logic of the programmable hardware component, and the access to the debugging interface can be blocked. Blocking of the access to the debugging interface by the switching element can take place for a defined period of time, or else until another event occurs, such as the arrangement switching on/off. In this way, multiple directly sequential, unauthorized accesses for changing the configuration of the programmable hardware component through the debugging interface can be prevented.

According to an embodiment, the configuration switching element can be designed such that, in the case of a configuration process, a switching off/on and/or a reset in the on-state of the arrangement and/or of the programmable hardware component takes place. Similarly, provision can be made that in the event of an unauthorized reprogramming, which is to say the detection of an undesired configuration process, the programmable hardware component again receives a configuration for the logic circuit through the configuration interface that corresponds to an initial state or a previously stored state. Thus, as soon as a user deletes a previous configuration of the programmable hardware component by unauthorized access through the debugging interface, new programming of the programmable hardware component with the previous configuration can take place automatically.

To this end, the arrangement can have a configuration device that is connected to the configuration interface. Similarly, the system can be designed such that even though unauthorized access for changing the configuration of the programmable hardware component through the debugging interface is detected, the access to the debugging interface nevertheless is not disabled. After a restart of the hardware component reprogrammed in this manner, a check can then be made as to whether the hardware component has a defined behavior, for example if a predefined signal is present at an interface of the programmable hardware component. If the behavior is present, the reprogramming can be permitted. Otherwise, the configuration of the programmable hardware component can be deleted and written through the configuration interface with a previously stored configuration.

The advantage of such an embodiment is that even though incorrect, unauthorized configurations can be installed, they generally do not result in damage, since the arrangement can immediately check automatically whether the reconfiguration would be problematic or perhaps nonproblematic after all. In the event of a problematic reconfiguration, for example, the circuitry between the programmable hardware component and other components that could be damaged in a problematic reconfiguration can be placed in a state that prevents damage. Similarly, upon detection of a prohibited configuration process, signaling to the user or the manufacturer can take place so that he can decide upon further steps.

In another embodiment, the configuration switching element can have a memory device, wherein an item of information is stored in the memory device that is used to determine whether the access through the configuration switching element is possible or not possible. The information can be implemented as a license or a license key that is used to determine whether or not a user has access to the debugging interface for changing the configuration of the programmable hardware component. This is because, as explained above, via the configuration switching element it is possible to control whether a configuration change of the programmable hardware component can be carried out through the debugging interface. The memory device can be a nonvolatile memory, for example, in which the license can be stored. Similarly, it is possible for the user to be able to download the license from the Internet and store it in the memory device.

According to an embodiment, the configuration switching element can be implemented as a CPLD, an FPGA, a processor, or a combination of the said programmable hardware components. Moreover, the configuration switching element can likewise be implemented as a mechanical jumper, switch, or another component such as a pull-up resistor and/or pull-down resistor.

According to an embodiment, the configuration monitoring interface can be implemented as part of the data interface, wherein the programmable hardware component can have a logic that signals a configuration process on that part of the data interface. For example, the FPGAs known from the prior art do not always have a separately implemented configuration monitoring interface. In this case, a pin of the data interface can be used for the functionality of the configuration monitoring interface, for example. In general, it is the case for FPGAs known from the prior art that the data interface, in particular the outputs of the data interface, take on a defined value during a programming process, for example logic 1, logic 0, weak high, weak low, or high impedance. This signal can be used in the present embodiment to detect a configuration process and to signal accordingly through the configuration monitoring interface. In one possible embodiment, the programmable hardware component places the outputs of its data interface in a weak high state during a programming process, from which a "logic 1" signal is detected at an output from this weak high state, and this signal is used to detect a configuration process.

According to another embodiment, the configuration monitoring interface can be implemented as part of a data interface, wherein the programmable hardware component has a logic that signals the end of a configuration process on the part of the data interface. In one possible embodiment, the logic outputs a predefined combination of signals of the types logic 1 and logic 0 at a number of predefined data outputs, and the output of this combination of signals is used to detect the end of a configuration process. In this way, the arrangement according to the invention can also be implemented on any desired programmable hardware components without the need for the programmable hardware component to have a separate, dedicated configuration monitoring interface.

The switching element can fundamentally be implemented in any desired manner, wherein the switching element can be implemented as a switchable bus driver, wherein the signaling of the configuration process can be accomplished through a configuration signal that is output through a separate, dedicated configuration monitoring interface, for example through the CONF_DONE and INIT_DONE signals of the FPGAs from the Altera Corporation.

According to another embodiment, the debugging interface can be implemented as a JTAG interface, for example, in conformance with IEEE Standard 1149.1. The data interface can be implemented as a data bus.

The JTAG interface can be carried through a bus driver in order to protect the JTAG interface from damaging influences from the outside such as overvoltage, reverse polarity, etc. The bus driver can have an Output Enable input, with which an output driver of the bus driver can be deactivated. In an embodiment of the invention, the configuration signal of the hardware component is connected to the Output Enable input of the bus driver so that the JTAG interface is not accessible to the user until the programmable hardware component is fully configured. In this state, the user can debug the programmable hardware component through the JTAG interface.

During the attempt to configure the programmable hardware component, the configuration signal becomes active so that the connection is disconnected by the bus driver, and reconfiguration of the programmable hardware component to a possibly harmful configuration is disabled. In order to nonetheless provide the supplier of the arrangement with unrestricted access to the JTAG interface to create his configuration during the development phase, the connection can be carried through a jumper, a zero ohm resistor, or the configuration switching element, for example. As already explained, access to the JTAG interface can be monitored through a CPLD, an FPGA, a processor, or a combination of two of the said types of programmable hardware components, in particular in order to control the output enable signal of the JTAG interface.

By means of the additional abovementioned embodiment, it is even possible to enable the debugging of the programmable hardware component via JTAG interface by software through the information stored as a license only for a portion of the users who have obtained the appropriate license. Similarly, the enabling can take place only for those users who have disclaimed all warranty and have then obtained unrestricted access to the JTAG interface in exchange.

A method for disabling configuration of a programmable hardware component is also provided, wherein the programmable hardware component has a configuration interface designed for configuring a logic of the programmable hardware component, a data interface designed for data exchange of the programmable hardware component with the hardware environment, a debugging interface designed for debugging and configuring the logic, and a configuration monitoring interface designed for signaling a configuration process of the logic, having the step: disabling an access of the debugging interface upon signaling of a configuration process.

In an exemplary embodiment, the access of a user to the debugging interface can be controlled in a granular fashion. Additional embodiments of the method according to the invention are evident to the person skilled in the art in analogy to the embodiments of the arrangement discussed above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
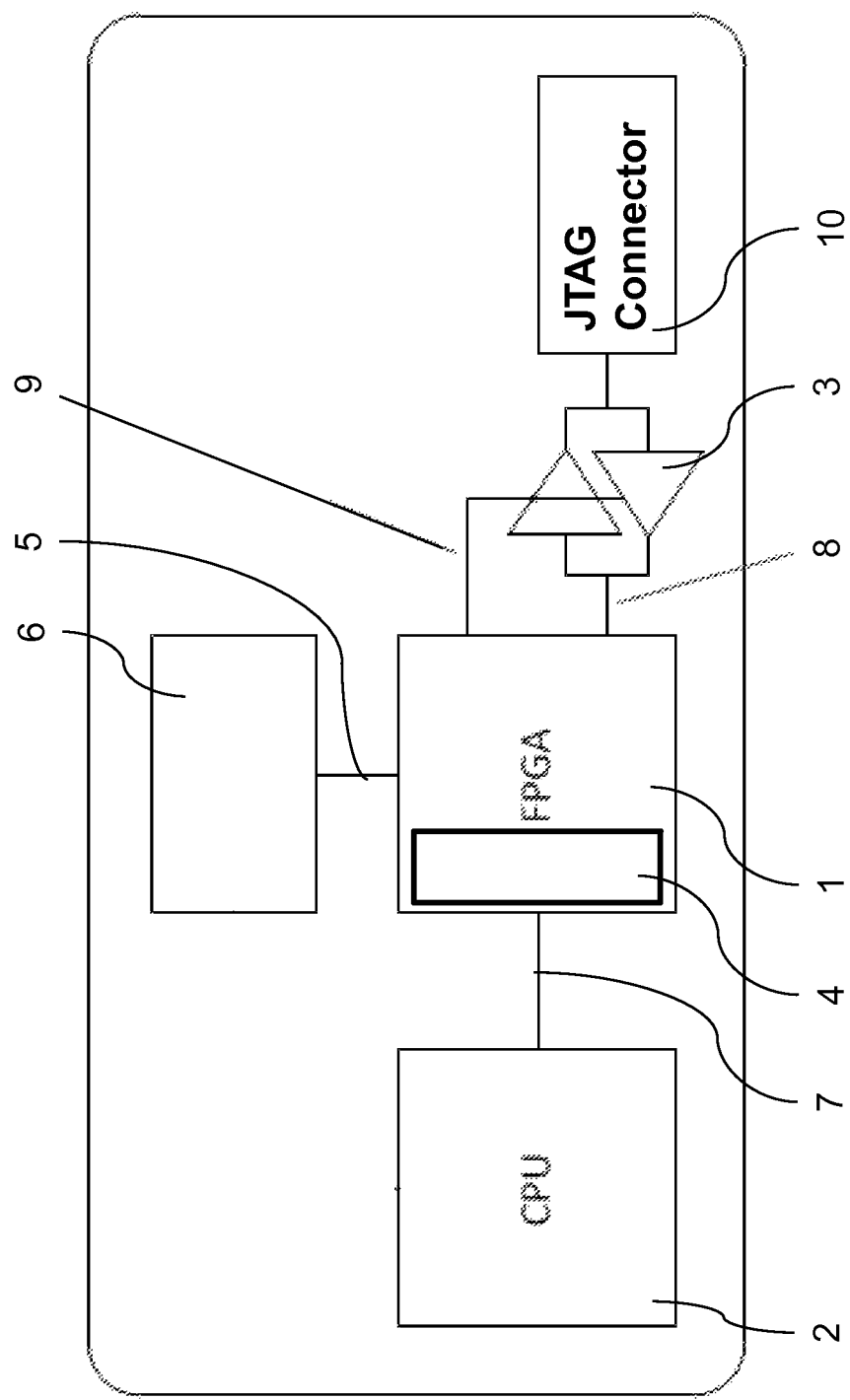
FIG. 1 is a schematic view of an arrangement according to an embodiment of the invention.
Figure 2:
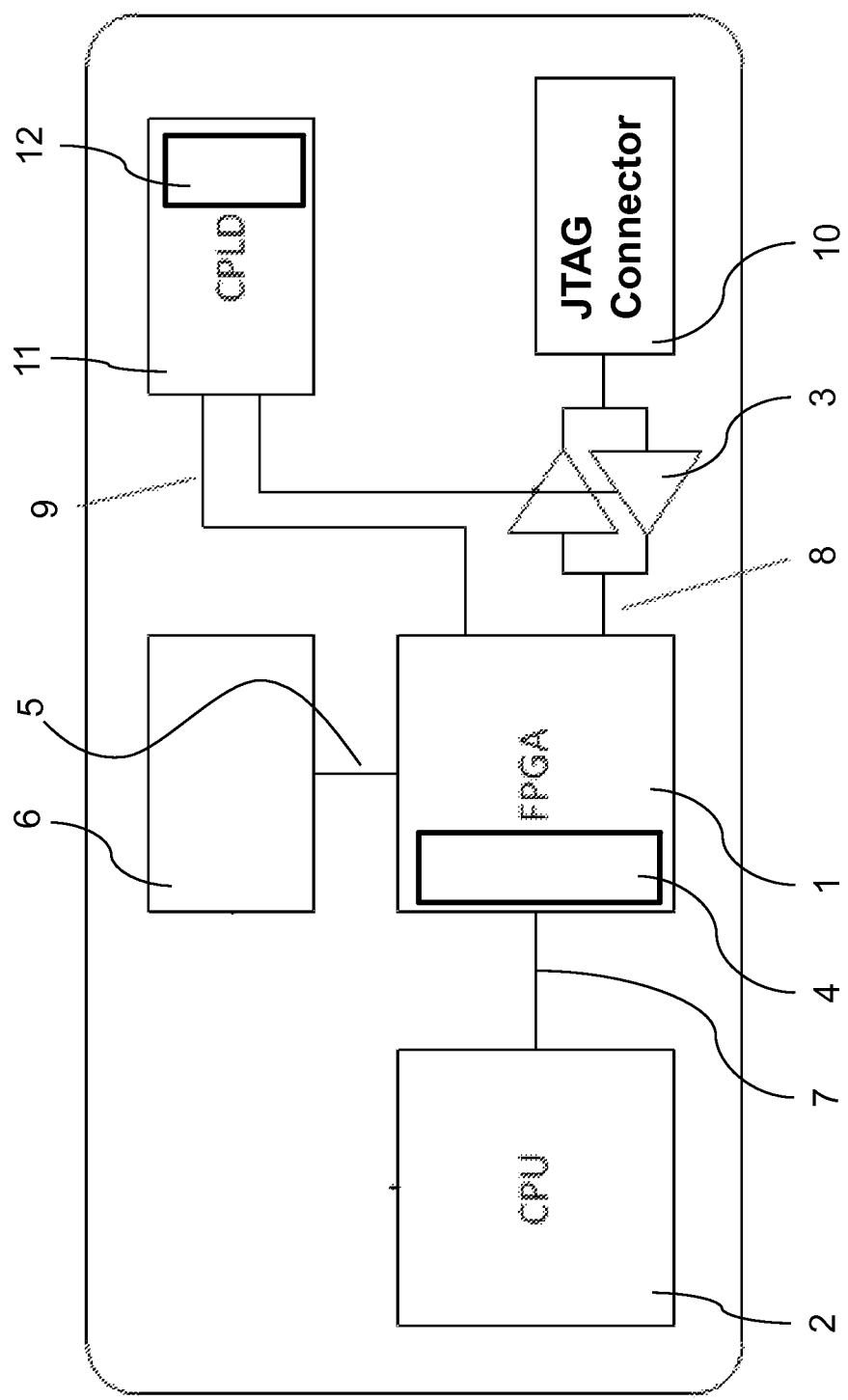
FIG. 2 is a schematic view of an arrangement according to an embodiment of the invention.
Figure 3:
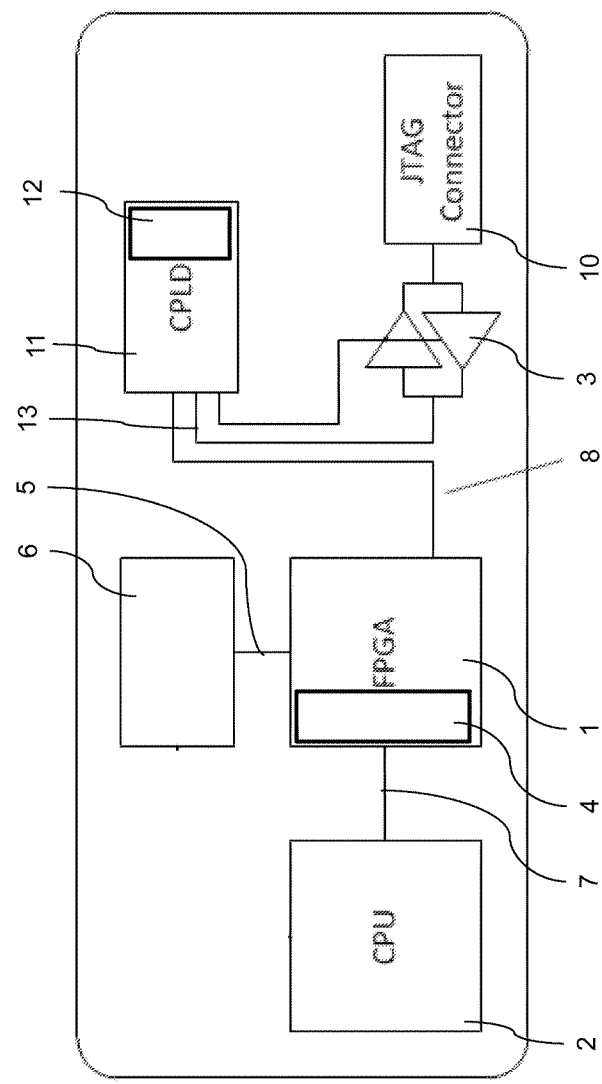
FIG. 3 is a schematic view of an arrangement according to an embodiment of the invention.

FIGS. 1 through 3 show an arrangement for disabling configuration of an FPGA 1 in three different exemplary embodiments.

As is evident from FIG. 1, the arrangement has in each case a microprocessor 2 and a switching element 3, in addition to the FPGA 1. The FPGA 1 has a logic circuit 4, which can be configured or programmed through a configuration interface 5 by a configuration device 6. In addition, the logic circuit 4 stands in communication connection with the microprocessor 2 through a data interface 7, which in the present case is implemented as a data bus. Furthermore, the FPGA 1 has a debugging interface 8, which is implemented as a JTAG interface in conformance with IEEE Standard 1149.1 for debugging and configuring the logic circuit 4. Finally, the FPGA 1 also has a configuration monitoring interface 9, which in the present case is implemented as a ConfigDone interface for signaling a configuration process of the logic circuit 4. A JTAG connector 10 allows the user access to the debugging interface 8 of the FPGA 1.

The FPGA 1 is designed such that, in the event of a configuration of the logic circuit 4, whether via configuration interface 5 or via debugging interface 8, the commencement of a change to the configuration of the FPGA 1 or of the logic circuit 4 is signaled at the configuration monitoring interface 9, for example by changing a signal level from logic 1 to 0.

As is also evident from FIG. 1, the switching element 3 is implemented as a bus driver, and is designed and connected to the debugging interface 8 such that access to the debugging interface 8 can be disabled in the event of a configuration process. In concrete terms, the bus driver 3 has an Output Enable input, with which the bus driver 3 or an output driver of the bus driver 3 can be deactivated. The ConfigDone signal, which is provided at the configuration monitoring interface 9 by the FPGA 1, is connected to the Output Enable input of the bus driver 3.

Now if programming of the FPGA 1 or programming of the logic circuit 4 is signaled by the ConfigDone signal, access to the debugging interface 8 is disabled by the bus driver 3. In this case, it is no longer possible to access the JTAG interface 8 through the JTAG connector 10. This achieves the result that, firstly, configuration of the FPGA 1 through the configuration device 6 by means of the configuration interface 5 is possible, and secondly, in normal operation, debugging of the FPGA 1 or of the logic circuit 4 of the FPGA 1 is possible by means of the JTAG connector 10 through the JTAG interface 8. However, if programming of the FPGA 1 takes place by means of the JTAG connector 10 through the JTAG interface 8, the configuration monitoring interface 9 signals the configuration process. Since the configuration monitoring interface 9 is connected to the switching element 3, in this case access to the JTAG interface 8 is disabled.

FIG. 2 shows a second embodiment of the arrangement with a configuration switching element 11, which in the present case is implemented as a CPLD for triggering the switching element 3. In addition, the configuration switching element 11 is connected to the configuration monitoring interface 9. This means that, in the event of signaling of a configuration process by means of the CPLD 11, the access to the JTAG interface 8 can be disabled by triggering of the bus driver 3 by the CPLD 11. On the other hand, however, the CPLD 11 can also be programmed in such a manner that, despite signaling of a configuration process by the configuration monitoring interface 9, the CPLD 11 does not cause interruption of the access to the debugging interface 8 by appropriate triggering of the bus driver 3. The CPLD 11 can also be programmed such that it does or does not interrupt access to the debugging interface 8 as a function of a signal emitted by another component, for example by the CPU 2, in the event a configuration process is signaled by the configuration monitoring interface 9.

The configuration switching element 11 can additionally have a memory device 12, wherein information, such as a license, is stored in the memory device 12, which information is used to determine whether access to the debugging interface 8 is allowed by the configuration switching element 11 or not. For example, if a user has purchased a suitable license, this license can contain the option that the user not only can carry out debugging of the logic circuit 4 through the debugging interface 8, but also can configure the logic circuit 4, even when a signal is sent by the configuration monitoring interface 9 to the configuration switching element 11 indicating that access to the debugging interface 8 should be disabled in the absence of a suitable license.

FIG. 3 shows a third preferred embodiment of the arrangement, in which the switching element 3 is connected to the debugging interface 8 by means of the configuration switching element 11 in such a way that a configuration process can be extracted from a trigger signal 13 transmitted to the debugging interface 8 by the switching element 3. This means that the configuration switching element 11 is able to determine from the trigger signal, for example by analyzing the bit sequences contained in the trigger signal 13, whether a configuration process is being initiated through the debugging interface 8 by the JTAG connector 10. If the configuration switching element 11 detects corresponding bit sequences, the access to the debugging interface 8 can be interrupted by the configuration switching element 11. It can also be possible in this design that the configuration switching element 11 deletes the bit sequences for configuring the FPGA 1 from the trigger signal 13 or replaces them with different bit sequences that specifically do not bring about configuration of the FPGA 1. In an advantageous implementation of this embodiment of the arrangement, the configuration switching element 11 is also provided with a delay element (not shown), for example a delay unit, that time-delays the transmission of data to the FPGA, and as a result gives the configuration switching element 11 sufficient time to analyze the data transmitted to the FPGA 1 and to delete bit sequences for configuring the FPGA 1 or to replace them with different bit sequences.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement for disabling a configuration of a first programmable hardware component, the arrangement comprising:
 a first programmable hardware component comprising a configuration interface designed for configuring a logic of the first programmable hardware component, a data interface, and a debugging interface designed for debugging and configuring of the logic; and
 a switching element configured and connected to the debugging interface and controlling access to the debugging interface during a configuration process of the logic such that access to the debugging interface is adapted to be disabled during the configuration process, interrupting the configuration process of the first programmable hardware component via the debugging interface,
 wherein the first programmable hardware component comprises a configuration monitoring interface to signal the configuration process of the logic, and
 wherein the switching element is connected to the configuration monitoring interface such that access to the debugging interface is disabled upon signaling of a configuration process by the configuration monitoring interface.

2. The arrangement according to claim 1, further comprising a configuration switching element designed to trigger the switching element.

3. The arrangement according to claim 2, wherein the configuration switching element is connected to the configuration monitoring interface and is designed to disable access to the debugging interface by triggering the switching element when a configuration process is signaled.

4. The arrangement according to claim 2, wherein the switching element is connected to the debugging interface via the configuration switching element such that selective access to the debugging interface in the event of a configuration process is provided.

5. The arrangement according to claim 4, wherein the configuration switching element detects, in a trigger signal transmitted to the debugging interface, a bit sequence that brings about a configuration process.

6. The arrangement according to claim 5, wherein the configuration switching element has a delay element, and wherein the delay element is designed to delay signals transmitted to the first programmable hardware component.

7. The arrangement according to claim 2, wherein an item of information used to determine whether the access through the configuration switching element is allowed or not allowed is stored in a memory device.

8. The arrangement according to claim 2, wherein the configuration switching element is a CPLD, an FPGA, a processor, or a combination of two or more types of programmable hardware components.

9. The arrangement according to claim 1, wherein the configuration monitoring interface is implemented within the data interface, and wherein the first programmable hardware component signals a configuration process via the configuration monitoring interface of the data interface.

10. The arrangement according to claim 1, wherein the configuration monitoring interface is a dedicated configuration monitoring interface separate from the configuration interface.

11. The arrangement according to claim 1, wherein the debugging interface is implemented as a JTAG interface in conformance with IEEE Standard 1149.1.

12. The arrangement according to claim 1, wherein the arrangement has a second programmable hardware component, wherein the data interface is connected to the second programmable hardware component for communication of the logic, and the second programmable hardware component configures the first programmable hardware component.

13. The arrangement according to claim 12, wherein the first programmable hardware component is an FPGA and the second programmable hardware component is a processor or an FPGA.

14. The arrangement according to claim 1, wherein the configuration interface and the debugging interface are provided by a circuit implemented outside of the first programmable hardware component, and wherein the configuration interface and the debugging interface are connected to a single interface of the first programmable hardware component through the circuit.

15. The arrangement according to claim 1, wherein the configuration process of the logic is run on the first programmable hardware component, the configuration monitoring interface signaling the configuration process of the first programmable hardware component.

16. An integrated circuit, comprising:
 a first programmable hardware component connected to a configuration interface that allows full configuration of program logic of the first programmable hardware component, a data interface, a configuration monitoring interface to signal a configuration process of the program logic, and a debugging interface for debugging and partial configuration of the program logic;
 a switch providing selective, repetitious disabling or enabling of the debugging interface, such that the debugging interface is disabled during the configuration process preventing interference via the debugging interface; and
 a configuration switching element connected to the configuration monitoring interface,
 wherein the configuration process is performed on the first programmable hardware component, and
 wherein the configuration switching element triggers switching element to disable the debugging interface if the configuration process is started.

* * * * *